3,023,208
1,2-BIS-(FLUOROALKYL)-1,2,3,6-TETRA-
HYDROPYRIDAZINES
William John Chambers, Claymont, Del., and Donald
Drake Coffman, West Chester, Pa., assignors to E. I.
du Pont de Nemours and Company, Wilmington, Del.,
a corporation of Delaware
No Drawing. Filed Feb. 9, 1960, Ser. No. 7,515
7 Claims. (Cl. 260—250)

This invention relates to a new and useful class of 1,2-bis(polyfluoroalkyl)-1,2,3,6-tetrahydropyridazines and to processes for preparing the same.

There are very few examples in the chemical literature of 1,2-disubstituted-1,2,3,6-tetrahydropyridazines, i.e., of compounds containing the nucleus (1) 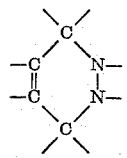

with substituents on the nitrogen atoms (i.e., the atoms in the 1- and 2-positions in the ring). No 1,2,3,6-tetrahydropyridazines having fluorine-containing substituents on the ring nitrogens are known. In fact, in spite of the ever increasing scientific and technical interest in fluorinated organic compounds, there are no reports in the literature of 1,2,3,6-tetrahydropyridazines having fluorine-containing substituents on any ring atom.

More particularly, this invention is directed to 1,2-bis($\alpha,\alpha$-difluorohaloalkyl) - 1,2,3,6 - tetrahydropyridazines characterized by the general formula (2) 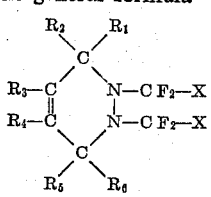

wherein

X is selected from the group consisting of fluorine, perhaloalkyl and $\omega$-hydroperhaloalkyl, $R_1$, $R_2$, $R_3$, $R_4$, $R_5$, and $R_6$ can be the same or different and are selected from the group consisting of hydrogen, halogen, and hydrocarbon radicals free of non-aromatic carbon-to-carbon unsaturation, and $R_1$ and $R_6$ can together form an alkylene bridge.

The term "perhaloalkyl" has reference, of course, to an alkyl radical containing only carbon and halogen atoms, and the term "$\omega$-hydroperhaloalkyl" has reference to an alkyl radical consisting of carbon and halogen atoms and only one hydrogen atom, this hydrogen atom being at the end of the chain. In both instances, the halogen atoms present are fluorine or chlorine. For the sake of brevity, the substituent —$CF_2$—X, which always contains at the minimum two fluorine atoms, will be referred to as the polyfluoroalkyl substituent in this application.

The phrase "hydrocarbon radical free of non-aromatic carbon-to-carbon unsaturation" has reference to an hydrocarbon radical in which any multiple carbon-to-carbon bonds are aromatic.

Preferred compounds of Formula 2 are those wherein X is selected from the group consisting of fluorine, perhaloalkyl radicals of 1 to 12 carbon atoms and $\omega$-hydroperhaloalkyl radicals of 1 to 12 carbon atoms, and $R_1$, $R_2$, $R_3$, $R_4$, $R_5$, and $R_6$ can be the same or different and are selected from the group consisting of hydrogen, halogen, alkyl of from 1 to 10 carbon atoms and aryl, alkaryl, aralkyl and cycloalkyl of from 6–10 carbon atoms, these radicals together having a total of not more than 12 carbon atoms, and $R_1$ and $R_6$, when joined together, form an alkylene bridge of 1 to 4 carbon atoms.

In general, the products of this invention are prepared by contacting a 1,2-bis($\alpha,\alpha$-difluoro)haloazoalkane with an organic compound containing a non-aromatic system of conjugated carbon-to-carbon double bonds. Preferably, the temperature at which such contacting is effected is at least 15° C. and can range up to the decomposition temperature of reactants or products. Also preferably, the mole ratio of these reactants is at least, respectively, 0.25:1.

The reaction which occurs when compounds of Formula 1 are so prepared is illustrated by the following equation, where all symbols are as previously defined (3) 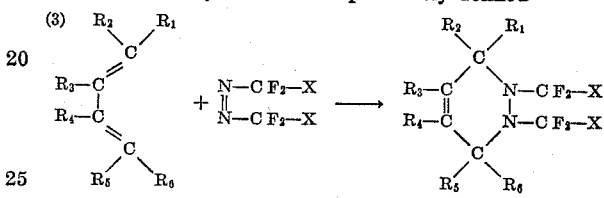

In the case where $R_1$ and $R_6$ are joined together as a divalent alkylene radical Q, e.g., —$CH_2$—,

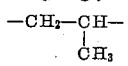

or the like, the reaction is similarly illustrated by the equation (4) 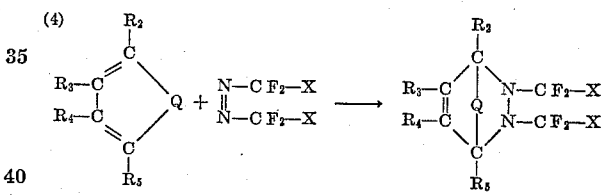

and the product is a 1,2,3,6-tetrahydropyridazine with an alkylene bridge between the 3- and 6-carbon atoms of the pyridazine ring.

One reactant used in making the products of the present invention contains a non-aromatic system of conjugated carbon-to-carbon double bonds and chemically is of the 1,3-diene type. These compounds are either available commercially or obtainable by well-established methods. They can be represented by the general formula (5) 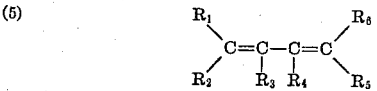

where $R_1$ through $R_6$ have their previously given significance and $R_1$ and $R_6$ together can be a divalent alkylene radical (as before).

The most accessible, and therefore the preferred, 1,3-diene compounds for use in the processes of the present invention are those having a total of from 4 through 16 carbon atoms, i.e., those compounds in which the groups $R_1$ through $R_6$ (in above formulas) when they are hydrocarbon radicals, contain together a total of up to 12 carbon atoms. Preferred embodiments of the groups $R_1$ through $R_6$ are those already defined in connection with the reaction products.

The other starting material used in making the products of this invention is a polyfluoroazoalkane of the formula (6)        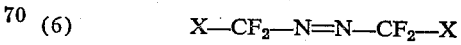

where X is fluorine, a perhaloalkyl or an $\omega$-hydroperhaloalkyl radical, the halogen in said radical being fluorine or chlorine.

The most accessible, and therefore preferred, polyfluoroazoalkanes for use in the process of this invention are those in which X in the general formula $$X-CF_2-N=N-CF_2-X$$

is fluorine or a perhaloalkyl or ω-hydroperhaloalkyl radical of 1-12 carbon atoms, i.e., those in which the polyfluoroalkyl radicals attached to the nitrogen atoms have from 1-13 carbon atoms.

Of these compounds, that in which X is fluorine, i.e., hexafluoroazomethane, $CF_3N=NCF_3$, which is a gas boiling at −32° C., can be prepared by methods reported in the literature, of which the most convenient is that described in U.S. Patent No. 2,912,429.

The other polyfluoroazoalkanes are prepared by a process which consists in reacting, at a temperature within the range of 25 to 250° C., a nitrile of the formula X—CN, where X is a perhaloalkyl or ω-hydroperhaloalkyl radical, as defined above, with a halogen of atomic number 17–35 (chlorine or bromine) and a fluoride of a metal of the group of sodium, potassium, rubidium, cesium, copper, silver, mercury and lead. This reaction is represented by the following equation, using silver(I) fluoride and chlorine as the illustrative inorganic reactants:

$$2X-CN + 2Cl_2 + 4AgF \rightarrow$$
$$X-CF_2-N=N-CF_2-X + 4AgCl$$

There are given below for guidance examples describing in detail the preparation of representative polyfluoroazoalkanes suitable for use in the process of this invention.

A. PERFLUOROAZOETHANE

A mixture of 20 g. of trifluoroacetonitrile, $CF_3CN$, 75 g. of silver(I) fluoride (mole ratio $AgF/CF_3CN$ 2.8:1) and 35 g. of bromine was heated in a bomb under autogenous pressure at 100° C. for 1 hour, 150° C. for 1 hour and 190° C. for 2 hours. The volatile reaction product (30 g.) was distilled. The fraction boiling at 16–20° C. (13 g.) was found by mass spectroscopy analysis to contain, on a molar basis, 90% of perfluoroazoethane, $C_2F_5N=NC_2F_5$, 3–8% of N-bromo(perfluoroethylidene)imine, $CF_3-CF=NBr$, and 1% of bromopentafluoroethane, $C_2F_5Br$. The residue in the still (6 g.) was found by infrared analysis to contain 75 mole percent of perfluoroazoethane. The conversion to perfluoroazoethane was 60%. Refractionation gave essentially pure perfluoroazoethane as a yellow-green liquid boiling at 18–20° C. at 760 mm.

B. PERFLUOROAZOPROPANE

A mixture of 30 g. of perfluoropropionitrile, $C_2F_5CN$, 75 g. of silver(I) fluoride and 40 g. of bromine was heated at 100° C. for 1 hour, then at 160° C. for 3 hours under autogenous pressure. Distillation of the volatile reaction product gave 8 g. of a yellow-green liquid, B.P. 68–71° C., which was shown by nuclear magnetic resonance and elemental analysis to be perfluoroazopropane, $C_3F_7N=NC_3F_7$.

*Analysis.*—Calcd. for $C_6F_{14}N_2$: C, 19.67; F, 72.68; N, 7.65. Found: C, 19.90; F, 71.93; N, 8.03.

There was also obtained 1 g. of N-bromo(perfluoropropylidene)imine, $C_2F_5-CF=NBr$, B.P. 55–61° C.

C. PERFLUOROAZOBUTANE

A mixture of 30 g. of perfluoro butyronitrile, 40 g. of silver(I) fluoride (mole ratio $AgF/C_3F_7CN$ 2:1) and 20 g. of bromine was heated at 100° C. for 1 hour and 160° C. for 2 hours under autogenous pressure. Distillation of the volatile reaction product gave 8 g. of N-bromo(perfluorobutylidene)imine, $C_3F_7-CF=NBr$, B.P. 75–77° C., and 9 g. of perfluoroazobutane, $C_4F_9N=NC_4F_9$, B.P. 100–112° C. On redistillation, perfluoroazobutane was obtained as a yellow-green liquid boiling at 113° C. at 760 mm., and identified by nuclear magnetic resonance and elemental analysis.

*Analysis.*—Calcd. for $C_8F_{18}N_2$: F, 73.40. Found: F, 72.76.

When this experiment was repeated, but with different proportions of reactants (50 g. $C_3F_7CN$, 98 g. AgF, 50 g. $Br_2$, mole ratio $AgF/C_3F_7CN$ 3:1), perfluoroazobutane was the principal reaction product (84% conversion).

D. PERFLUOROAZOOCTANE

The starting material in this example was perfluorooctanenitrile, $C_7F_{15}CN$, prepared by heating with phosphoric anhydride the ammonium salt of perfluorooctanoic acid. The acid itself was a commercial sample containing approximately 70% of $CF_3(CF_2)_6COOH$, the remainder consisting of a mixture of the isomeric acids,

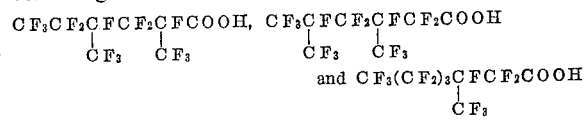

and $CF_3(CF_2)_3CFCF_2COOH$
             |
             $CF_3$

A mixture of 28 g. of perfluorooctanenitrile, 81 g. of silver(I) fluoride and 5 g. of chlorine was heated under autogenous pressure at 100° C. for 1 hour, then at 140° C. for 2 hours. The total reaction product was removed from the bomb and heated at 155° C. under 0.35 mm. pressure to recover the volatile material. There was thus obtained 22 g. of a liquid which solidified to a low melting solid. Redistillation of this product gave 20 g. (65% conversion) of a yellow-green, low melting solid boiling at 67–75° C. at 0.2 mm. pressure, which was shown by elemental analysis to be perfluoroazooctane, $$C_8F_{17}N=NC_8F_{17}$$

*Analysis.*—Calcd. for $C_{16}F_{34}N_2$: C, 22.17; F, 74.60. Found: C, 22.31; F, 74.50.

E. ω-HYDROPERFLUOROAZOPROPANE

A mixture of 18 g. of 2,2,3,3-tetrafluoropropanenitrile, $HCF_2CF_2CN$, 60 g. of silver(I) fluoride and 11 g. of chlorine was heated at 75° C. for 1 hour and 125° C. for 1 hour under autogenous pressure. The total reaction mass was removed from the bomb and heated at 150° C. under 0.15 mm. pressure to recover the volatile reaction product. Distillation of the latter gave 2 g. of a fraction (I) boiling at 58° C. at 760 mm. and 10 g. of a fraction (II) boiling at 106–108° C. at 760 mm.

Fraction (I) was identified by nuclear magnetic resonance and elemental analysis as N-chloro(ω-hydroperfluoropropylidene)imine, $HCF_2CF_2CF=NCl$, obtained in 8% conversion.

*Analysis.*—Calcd. for $C_3HF_5ClN$: F, 52.30; Cl, 19.60. Found: F, 52.49; Cl, 18.85.

Fraction (II) was identified in the same manner as ω-hydroperfluoroazopropane, $H(CF_2)_3N=N(CF_2)_3H$, obtained in 43% conversion.

*Analysis.*—Calcd. for $C_6H_2F_{12}N_2$: F, 69.09; N, 8.49. Found: F, 68.83; N, 8.73.

F. ω-HYDROPERFLUOROAZOPENTANE

A mixture of 39 g. of ω-hydroperfluoropentanenitrile, $H(CF_2)_4CN$, 60 g. of silver(I) fluoride and 12 g. of chlorine was heated under autogenous pressure at 75° C. for 1 hour and 125° C. for 1 hour. A 17-g. liquid portion was removed from the total reaction product, and another 18-g. portion of liquid reaction product was recovered by heating the solids at 125° C. under 1–2 mm. pressure. Distillation of the combined liquids gave 11 g. of a fraction (I), a colorless liquid boiling at 100–102° C. at 760 mm.; and 17 g. of a fraction (II), a yellow liquid boiling at 85–86° C. at 28 mm.

Fraction (I) was identified by nuclear magnetic resonance and elemental analysis as N-chloro(ω-hydroperfluoropentylidene)imine, $H(CF_2)_4CF=NCl$, obtained in 23% conversion.

*Analysis.*—Calcd. for $C_5HF_9ClN$: F, 60.75; Cl, 12.61. Found: F, 60.54; Cl, 12.76.

Fraction (II) was identified in the same manner as ω - hydroperfluoroazopentane, $H(CF_2)_5N=N(CF_2)_5H$, obtained in 37% conversion.

*Analysis.*—Calcd. for $C_{10}H_2F_{20}N_2$: F, 71.70. Found: F, 71.55.

G. 3,3-DICHLORO-1,1,2,2-TETRAFLUOROAZO-PROPANE

A mixture of 12 g. of 3,3-dichloro-2,2-difluoro-propanenitrile, $HCCl_2CF_2CN$, 54 g. of silver(I) fluoride and 6 g. of chlorine was heated under autogenous pressure at 100° C. for 1 hour and 125° C. for 1 hour. The liquid reaction product (10 g.) was recovered by heating the total reaction mass at 125–135° C. under 2 mm. pressure. Distillation of this liquid product gave 5.5 g. (37% conversion) of 3,3-dichloro-1,1,2,2-tetrafluoroazopropane, $HCCl_2CF_2CF_2N=NCF_2CF_2CCl_2H$, as a yellow-green liquid boiling at 75–79° C. at 11 mm., whose structure was confirmed by nuclear magnetic resonance and elemental analysis.

*Analysis.*—Calcd. for $C_6H_2Cl_4F_8N_2$: F, 38.38; Cl, 35.86. Found: F, 37.14; Cl, 37.88.

H. 2,2,2-TRICHLORO-1,1-DIFLUOROAZOETHANE

A mixture of 40 g. of trichloroacetonitrile, $CCl_3CN$, 100 g. of silver(I) fluoride and 22 g. of chlorine was heated under autogenous pressure at 75° C. for 1 hour and 125° C. for 1 hour. The volatile reaction product was recovered by heating the total reaction mass at 190° C. under 0.6 mm. pressure. There was thus obtained 33 g. of liquid which, on redistillation, gave the following fractions: (I), 4.5 g., B.P. 78–83° C.; (II), 3 g., B.P. 120–125° C.; (III), 19 g., B.P. 62.5–65° C. at 6 mm. pressure.

Fraction (I) was essentially all unreacted trichloroacetonitrile.

Fraction (II) was a pale yellow liquid, readily hydrolyzed by warm 10% aqueous sodium hydroxide. Nuclear magnetic resonance analysis showed that this product consisted essentially of N-chloro(2,2,2-trichloro-1-fluoroethylidene)imine, $Cl_3C—CF=NCl$.

Fraction (III) was a yellow-green liquid resistant to hydrolysis by warm 10% aqueous sodium hydroxide. Elemental analysis and molecular weight determination showed that this product was 2,2,2-trichloro-1,1-difluoroazoethane, $CCl_3CF_2N=NCF_2CCl_3$.

*Analysis.*—Calcd. for $C_4Cl_6F_4N_2$: Cl, 58.36; F, 20.80; M.W., 365. Found: Cl, 58.01; F, 21.10; M.W., 345.

Other polyfluoroazoalkanes which can be prepared by the same general procedure and which are suitable for use in the process of this invention include 2-chloro-1,1,2-trifluoroazoethane,
$HCFClCF_2N=NCF_2CFClH$;
2-chloro-1,1,2,2-tetrafluoroazoethane,
$ClCF_2CF_2N=NCF_2CF_2Cl$;
2,2,3,3-tetrachloro-1,1-difluoroazopropane,
$HCCl_2CCl_2CF_2N=NCF_2CCl_2CCl_2H$;
2,2,3,3,3-pentachloro-1,1-difluoroazopropane,
$CCl_3CCl_2CF_2N=NCF_2CCl_2CCl_3$;
2-chloro-1,1,2,3,3-pentafluoroazopropane,
$HCF_2CFClCF_2N=NCF_2CFClCF_2H$;
2,3-dichloro-1,1,2,3,3-pentafluoroazopropane,
$ClCF_2CFClCF_2N=NCF_2CFClCF_2Cl$;
perfluoroazoisobutane,
$(CF_3)_2CFCF_2N=NCF_2CF(CF_3)_2$;
7-hydrotrichloroundecafluoroazoheptane,
$H(CF_2CFCl)_3CF_2N=NCF_2(CF_2CFCl)_3H$;
ω-hydroperfluoroazononane,
$H(CF_2)_9N=N(CF_2)_9H$;
9-hydrooctachlorodecafluoroazononane,
$H(CF_2CCl_2)_4CF_2N=NCF_2(CF_2CCl_2)_4H$;
perfluoroazodecane,
$CF_3(CF_2)_9N=N(CF_2)_9CF_3$;
ω-hydroperfluoroazotridecane,
$H(CF_2)_{13}N=N(CF_2)_{13}H$;
and the like.

The synthesis of the 1,2-bis(polyfluoroalkyl)-1,2,3,6-tetrahydropyridazines is conducted simply by maintaining in contact at reaction temperature a mixture of the polyfluoroazoalkane and the 1,3-diene compound in amounts such that there is present at least 0.25 mole of polyfluoroazoalkane per mole of 1,3-diene. The polyfluoroazoalkane can be used in excess, if desired, e.g., up to 2 or 3 moles per mole of diene. Preferably, the two reactants are used in approximately equimolar amounts.

The optimum reaction temperature depends, of course, on the reactivity of the components, especially that of the 1,3-diene, and on the time of contact. With the more reactive dienes, reaction takes place at ordinary temperature of 15–25° C. Less reactive systems require elevated temperatures, which normally need not exceed about 200° C. The most useful temperature range is that between 50 and 175° C. Substantial reaction takes place in periods as short as 10–30 minutes in the more reactive systems, and contact times exceeding 8–12 hours are generally unnecessary.

A solvent or diluent is not necessary, but can be used if desired. For this purpose, any organic liquid free of aliphatic unsaturation and which is at least a partial solvent for the reactants can be used, such as aliphatic or aromatic hydrocarbons, acyclic or cyclic ethers, fluorocarbons, etc. Polymerization inhibitors may optionally be used, especially when the diene compound is readily polymerizable at the operating temperature.

With gaseous or low-boiling reactants, the process is conveniently carried out in sealed vessels, with or without agitation, under the autogenous pressure developed by the reactants at the operating temperature. With higher-boiling reactants, or when a solvent is used, the reaction can be carried out at atmospheric or even subatmospheric pressure, under reflux conditions if necessary.

The reaction product is separated from the reaction mixture by any suitable conventional procedure, such as distillation at atmospheric or reduced pressure, or cooling and crystallization for solid products.

The invention is illustrated in greater detail in the following examples.

Example I

A glass pressure tube was charged with 3.29 g. (0.04 mole) of 2,3-dimethyl-1,3-butadiene and 6.64 g. (0.04 mole) of hexafluoroazomethane. The tube was sealed and heated at 100–137° C. for 30 minutes. The liquid reaction product was distilled under reduced pressure and then refractionated to give 4.47 g. of a colorless liquid boiling at 69° C. at 40 mm. pressure. This was 1,2-bis(trifluoromethyl)-4,5-dimethyl-1,2,3,6-tetrahydropyridazine,

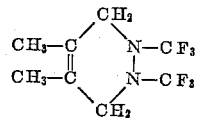

*Analysis.*—Calcd. for $C_8H_{10}F_6N_2$: C, 38.70; H, 4.06; F, 45.96; N, 11.29. Found: C, 39.12; H, 5.04; F, 45.16; N, 10.61.

The infrared and nuclear magnetic resonance analyses confirmed the structure of the reaction product.

Example II

The reactants of Example I (0.1 mole of each) were heated in a metal shaker tube for 2 hours at 50° C., then 3 hours at 100° C. 1,2-bis(trifluoromethyl)-4,5-dimethyl-1,2,3,6-tetrahydropyridazine, B.P. 59° C. at 22 mm. pressure, $n_D^{24.5}$. 1.3740, was obtained in 85% yield.

Example III

A glass tube was charged with 3.3 g. (0.05 mole) of cyclopentadiene and 8.3 g. (0.05 mole) of hexafluoroazomethane. The tube was sealed and heated for 6 hours at 55° C. From the reaction product was recovered 1.72 g. of unreacted hexafluoroazomethane. Fractionation of the residue gave 7.9 g. (68% yield) of a liquid boiling at 45–52° C. at 12 mm. pressure. Nuclear magnetic resonance analysis showed that this product had the structure of 1,2-bis(trifluoromethyl)-3,6-methano - 1,2,3,6 - tetrahydropyridazine,

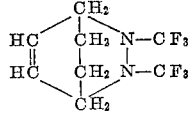

Example IV

The reaction of Example III was also carried out at atmospheric pressure as follows: A mixture of 3.3 g. of cyclopentadiene and 8.3 g. of hexafluoroazomethane in 50 ml. of tetrahydrofuran was heated to reflux (50–60° C.) for 3 hours under a condenser cooled with a solid carbon dioxide-acetone mixture. After allowing the mixture to stand for 2 days at room temperature, the solvent was removed by distillation and the residue was fractioned to give 2.9 g. of 1,2-bis(trifluoromethyl)-3,6-methano-1,2,3,6-tetrahydropyridazine, B.P. 47° C. at 14 mm. pressure.

Example V

A metal shaker tube was charged with 6 g. (0.11 mole) of 1,3-butadiene and 20 g. (0.12 mole) of hexafluoroazomethane and heated for 2 hours at 50° C., then for 2 hours at 100° C. Fractionation of the liquid reaction product under reduced pressure gave 9.53 g. of a liquid boiling at 45° C. at 46 mm. pressure, $n_D^{24.5}$ 1.3528. This was 1,2-bis(trifluoromethyl)-1,2,3,6-tetrahydropridazine,

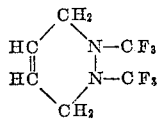

*Analysis.*—Calcd. for $C_6H_6F_6N_2$: C, 32.72; H, 2.75: F, 51.81; N, 12.74. Found: C, 33.88; H, 2.81; F, 52.59; N, 12.89.

The infrared and nuclear magnetic resonance analyses confirmed the structure of the reaction product.

Example VI

A metal shaker tube charged with 3.4 g. (0.063 mole) of 1,3-butadiene and 15.8 g. (0.029 mole) of ω-hydroperfluoroazopentane was heated for 6 hours at 167° C. Distillation of the resulting viscous liquid reaction product gave first about 1 g. of liquid boiling at 66–98° C. at 1.1 mm. pressure, then 9.66 g. (55% yield) of a liquid boiling at 105–106° C. at 1.1 mm. pressure, which was shown by elemental and infrared analyses to be 1,2-bis(ω-hydroperfluoropentyl)-1,2,3,6-tetrahydropyridazine,

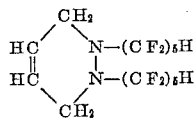

*Analysis.*—Calcd. for $C_{14}H_8F_{20}N_2$: F, 65.07; N, 4.79. Found: F, 65.18; N, 5.24.

Example VII

A metal shaker tube charged with 4 g. (0.074 mole) of 1,3-butadiene and 30 g. (0.064 mole) of perfluoroazobutane was heated for 4 hours at 144° C. Distillation of the reaction product gave first 9.68 g. of unreacted perfluoroazobutane, then 15 g. (66% yield) of a liquid boiling at 70.5° C. at 4 mm. pressure, which was shown by elemental and infrared analyses to be 1,2-bis(perfluorobutyl)-1,2,3,6-tetrahydropyridazine,

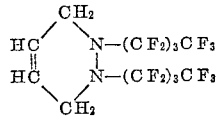

*Analysis.*—Calcd. for $C_{12}H_6F_{18}N_2$: C, 27.69; H, 1.16; F, 65.76; N, 5.39. Found: C, 28.58; H, 1.67; F, 65.42; N, 5.68.

Example VIII

A mixture of 2 g. (0.025 mole) of 2,3-dimethylbutadiene-1,3 and 6.92 g. (0.02 mole) of 2,2,2-trichloro-1,1-difluoroazoethane was stirred and heated at reflux (about 1100° C.) for 4 hours. Two distillations of the reaction product gave 3.92 g. (44% yield) of a liquid boiling at 59–60° C. at 1.1 mm. pressure, which was shown by infrared analysis to be 1,2-bis(2,2,2-trichloro-1,1-difluoroethyl)-4,5-dimethyl-1,2,3,6-tetrahydropyridazine,

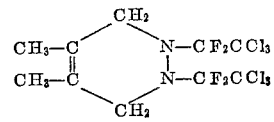

Other specific examples of 1,2-bis(polyfluoroalkyl)-1,2,3,6-tetrahydropyridazines are preparable by following the procedures described and illustrated by the examples above, as follows:

1,2-bis(2-chloro-1,1,2-trifluoroethyl) - 4 - methyl-1,2,3,6-tetrahydropyridazine, from isoprene and 2-chloro-1,1,2-trifluoroazoethane.

1,2-bis(perfluoroethyl)-3,6-ethano - 1,2,3,6 - tetrahydropyridazine, from cyclohexadiene-1,3 and perfluoroazoethane.

1,2-bis(2-chloro-1,1,2,2,-tetrafluoroethyl)-3,6-dimethyl-1,2,3,6-tetrahydropyridazine, from 2,4-hexadiene and 2-chloro-1,1,2,2,-tetrafluoroazoethane.

1,2,-bis(perfluoropropyl)-3,3-diethyl-1,2,3,6-tetrahydropyridazine, from 4-ethyl-1,3-hexadiene and perfluoroazopropane.

1,2-bis(ω-hydroperfluorononyl) - 3-cyclohexyl-1,2,3,6-tetrahydropyridazine, from 1-cyclohexyl-1,3-butadiene and ω-hydroperfluoroazononane.

1,2-bis(ω-hydroperfluoropentyl) - 3-isopropyl-6-methyl-6-ethyl-1,2,3,6- tetrahydropyridazine, from 2,6-dimethyl-3,5-octadiene and ω-hydroperfluoroazopentane.

1,2-bis(2,2,3,3-tetrachloro-1,1-difluoropropyl) - 4-naphthyl-1,2,3,6 - tetrahydropyridazine, from 2-naphthyl-1,3-butadiene and 2,2,3,3-tetrachloro-1,1-difluoroazopropane.

1,2-bis(perfluorodecyl)-4,5-diphenyl-1,2,3,6-tetrahydropyridazine, from 2,3-diphenyl-1,3-butadiene and perfluoroazodecane.

1,2-bis (2,2,3,3,3-pentachloro-1,1 - difluoropropyl) - 4-decyl-1,2,3,6-tetrahydropyridazine, from 2-decyl-1,3-butadiene and 2,2,3,3,3-pentachloro-1,1-difluoroazopropane.

1,2-bis(9-hydrooctachlorodecafluorononyl) - 3,3,6,6-tetramethyl-1,2,3,6-tetrahydropyridazine, from 1,1,4,4-tetramethyl - 1,3-butadiene and 9-hydrooctachlorodecafluoroazononane.

1,2-bis (ω-hydroperfluorotridecyl) - 3-methyl-3-p-tolyl-1,2,3,6-tetrahydropyridazine, from 4-p-tolyl-1,3 - pentadiene and ω-hydroperfluoroazotridecane.

1,2-bis(ω-hydroperfluoropropyl)-4-benzyl-3,6-methano-1,2,3,6-tetrahydropyridazine, from 2-benzyl-1,3-cyclopentadiene and ω-hydroperfluoroazopropane.

1,2-bis(7-hydrotrichloroundecafluoroheptyl) - 4-chloro-1,2,3,6-tetrahydropyridazine, from 2-chloro-1,3-butadiene and 7-hydrotrichloroundecafluoroazoheptane.

1,2-bis (2,2,2-trichloro-1,1-difluoroethyl)-3-chloro-5,6-dimethyl-1,2,3,6 - tetrahydropyridazine, from 1-chloro-3-methyl-1,3-pentadiene and 2,2,2-trichloro-1,1-difluoroazoethane.

The 1,2-bis(polyfluoroalkyl)-1,2,3,6 - tetrahydropyridazines of this invention possess physical and chemical properties which make them well adapted for a variety of technical uses. In the first place, they have good solvent power for a large member of organic materials, especially hydrocarbons, halohydrocarbons, esters, amides and the like, and they do not support combustion, i.e., they do not burn in the absence of a flame. Because of these properties, they are useful and safe solvents for use in aerosol compositions, insecticidal sprays, wax compositions and the like. They are also good degreasing solvents for metals, textiles, glass and other surfaces such as wood or plaster. For such applications they can be used either in the liquid phase (e.g., spot cleaning) or in the vapor phase (e.g., dry cleaning, metal degreasing). For example, aluminum and stainless steel strips were coated with a hydrocarbon-type industrial grease and placed in the refluxing vapors (about 150° C.) of 1,2-bis(trifluoromethyl - 4,5-dimethyl-1,2,3,6-tetrahydropyridazine. The grease was completely removed from the metal strips in 10 to 30 seconds. Other 1,2-bis(polyfluoroalkyl) - 1,2,3,6-tetrahydropyridazines have a similar solvent action on mineral or vegetable oils and greases.

The intracyclic double bond in the 1,2-bis-(polyfluoroalkyl)-1,2,3,6-tetrahydropyridazines is susceptible of addition reactions with many reagents. Thus, it adds halogens and hydrogen halides rapidly, as shown for example by the fact that 1,2-bis-trifluoromethyl)-4,5-dimethyl-1,2,3,6-tetrahydropyridazine absorbs bromine in carbon tetrachloride solution instantly at room temperature to give the dibromo adduct. Other 1,2-bis(polyfluoroalkyl)-1,2,3,-6-tetrahydropyridazines act similarly. This property makes them valuable in the removal of halogens or hydrogen halides from vapors or gases containing them without having to resort to the use of aqueous reagents. Thus, they can be used as halogen or hydrogen halide scavengers in analytical procedures or organic reactions, and as stabilizers for halogenated organic materialas (e.g., fire extinguisher compositions, solvents, polymers, etc.) which tend to evolve halogens or hydrogen halides on storage.

The 1,2-bis(polyfluoroalkyl)-1,2,3,6-tetrahydropyridazines are further useful as solvents for highly fluorinated polymers. The solutions so obtained can be used to impregnate porous materials such as textiles, paper, wood, brick, etc. and to coat non-porous materials such as metals. For example, a solution containing about 20% by weight of low melting tetrafluoroethylene polymer M.P. 83-105° C.) was prepared by heating a mixture of the polymer and 1,2-bis(trifluoromethyl)-4,5-dimethyl-1,2,3,6-tetrahydropyridazine to reflux. A strip of filter paper was partly immersed in the clear solution, then dried in air and exposed to a stream of water. The area of the strip which had been immersed in the polymer solution shed water completely and did not become wet, whereas the untreated portion of the paper became wet and soggy, demonstrating the waterproofing effect obtained by impregnation with the polymer.

The foregoing detailed description has been given for clearness of understanding only and no unnecessary limitations are to be understood therefrom. The invention is not limited to the exact details shown and described, for other modifications will occur to those skilled in the art.

The embodiments of the invention in which an exclusive property or privilege is claimed are defined as follows:

1. Compounds of the formula

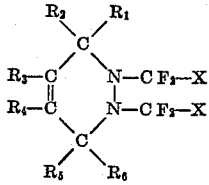

wherein X is selected from the class consisting of fluorine, and perhaloalkyl and ω-hydroperhaloalkyl of from 1 to 12 carbon atoms, the halogen atoms being selected from the class consisting of fluorine and chlorine; $R_1$, $R_2$, $R_3$, $R_4$, $R_5$ and $R_6$, taken individually, are selected from the class consisting of hydrogen, halogen, alkyl of from 1 to 10 carbon atoms and aryl, alkaryl, aralkyl and cycloalkyl of from 6 to 10 carbon atoms and $R_1$ and $R_6$, taken together, are divalent alkylene of from 1 to 4 carbon atoms, the total number of carbon atoms in $R_1$, $R_2$, $R_3$, $R_4$, $R_5$ and $R_6$ combined being up to 12.

2. 1,2 - bis(trifluoromethyl) - 4,5 - dimethyl - 1,2,3,6-tetrahydropyridazine.

3. 1,2 - bis(trifluoromethyl) - 3,6 - methano - 1,2,3,6-tetrahydropyridazine.

4. 1,2 - bis(trifluoromethyl) - 1,2,3,6 - tetrahydropyridazine.

5. 1,2 - bis(ω - hydroperfluoropentyl) - 1,2,3,6 - tetrahydropyridazine.

6. 1,2-bis(perfluorobutyl)-1,2,3,6-tetrahydropyridazine.

7. 1,2 - bis(2,2,2 - trichloro - 1,1 - difluoroethyl) - 4,5-dimethyl-1,2,3,6-tetrahydropyridazine.

References Cited in the file of this patent

MacKenzie et al.: J. Org. Chem., vol. 17 (1952), pages 1666–1674.